(12) United States Patent
Park

(10) Patent No.: US 9,984,827 B2
(45) Date of Patent: May 29, 2018

(54) CAPACITOR COMPONENT

(71) Applicant: SAMSUNG ELECTRO-MECHANICS CO., LTD., Suwon-si, Gyeonggi-do (KR)

(72) Inventor: Heung Kil Park, Suwon-si (KR)

(73) Assignee: SAMSUNG ELECTRO-MECHANICS CO., LTD., Suwon-si, Gyeonggi-Do (KR)

(*) Notice: Subject to any disclaimer, the term of this patent is extended or adjusted under 35 U.S.C. 154(b) by 0 days. days.

(21) Appl. No.: 15/407,356

(22) Filed: Jan. 17, 2017

(65) Prior Publication Data

US 2017/0352481 A1 Dec. 7, 2017

(30) Foreign Application Priority Data

Jun. 2, 2016 (KR) .................. 10-2016-0069035

(51) Int. Cl.
*H01G 4/38* (2006.01)
*H01G 4/30* (2006.01)
(Continued)

(52) U.S. Cl.
CPC .............. *H01G 4/30* (2013.01); *H01G 4/012* (2013.01); *H01G 4/12* (2013.01); *H01G 4/232* (2013.01)

(58) Field of Classification Search
CPC .................................. H01G 4/38; H01G 4/385
(Continued)

(56) References Cited

U.S. PATENT DOCUMENTS

| 8,213,155 B2* | 7/2012 | Lee | ........... H01G 4/012 |
| | | | 361/303 |
| 9,520,238 B2* | 12/2016 | Lee | ........... H01G 4/30 |

(Continued)

FOREIGN PATENT DOCUMENTS

| JP | 2004-253425 A | 9/2004 |
| JP | 2007-235170 A | 9/2007 |

(Continued)

OTHER PUBLICATIONS

Notice of Office Action dated Mar. 28, 2017, issued in Korean Patent Application No. 10-2016-0069035, with English language translation.

*Primary Examiner* — Eric Thomas
(74) *Attorney, Agent, or Firm* — McDermott Will & Emery LLP

(57) ABSTRACT

A capacitor component includes a body including a plurality of dielectric layers having a layered structure, and first internal electrodes and second internal electrodes alternately disposed with respective dielectric layers of the plurality of dielectric layers interposed therebetween, a first external electrode formed on a first surface and a second surface of the body opposing each other, and connected to the first internal electrodes, and a second external electrode formed on at least one of a third surface and a fourth surface of the body connecting the first surface to the second surface and opposing each other, and connected to the second internal electrodes. The capacitor component is divided into a plurality of capacitor units each including a portion of the first internal electrodes and a portion of the second internal electrodes, and the plurality of capacitor units include a first capacitor unit and a second capacitor unit.

16 Claims, 9 Drawing Sheets

(51) Int. Cl.
  *H01G 4/012* (2006.01)
  *H01G 4/12* (2006.01)
  *H01G 4/232* (2006.01)

(58) Field of Classification Search
  USPC .................................................. 361/328–330
  See application file for complete search history.

(56) References Cited

U.S. PATENT DOCUMENTS

| | | |
|---|---|---|
| 2004/0184202 A1 | 9/2004 | Togashi et al. |
| 2008/0174934 A1 | 7/2008 | Togashi |
| 2008/0186652 A1 | 8/2008 | Lee et al. |
| 2009/0059469 A1 | 3/2009 | Lee et al. |
| 2009/0244803 A1 | 10/2009 | Lee et al. |
| 2010/0033897 A1 | 2/2010 | Lee et al. |
| 2010/0091427 A1 | 4/2010 | Lee et al. |
| 2014/0138137 A1* | 5/2014 | Kwag .................... H01G 4/012 174/260 |

FOREIGN PATENT DOCUMENTS

| | | |
|---|---|---|
| JP | 2008-071811 A | 3/2008 |
| JP | 2015-026843 A | 2/2015 |
| KR | 10-2009-0105115 A | 10/2009 |
| KR | 10-0920614 B1 | 10/2009 |
| KR | 10-0925623 B1 | 11/2009 |
| KR | 10-2010-0100722 A | 9/2010 |
| KR | 10-0983122 B1 | 9/2010 |

\* cited by examiner

CAPACITOR COMPONENT

CROSS-REFERENCE TO RELATED APPLICATION

This application claims the benefit of priority to Korean Patent Application No. 10-2016-0069035, filed on Jun. 2, 2016 with the Korean Intellectual Property Office, the entire disclosure of which is incorporated herein by reference.

TECHNICAL FIELD

The present disclosure relates to a capacitor component including capacitor units.

BACKGROUND

A multilayer ceramic capacitor (MLCC), a capacitor component, is a condenser in the form of a chip serving to charge or discharge electricity while being mounted on a printed circuit board of a liquid crystal display (LCD) a plasma display panel (PDP), or the like, of various electronic products such as video cameras, computers, smartphones, mobile phones, and the like.

An MLCC may be used as a component of various electronic devices since an MLCC is small, ensures high capacity, and is easily mounted.

Particularly, a power supply device for a central processing unit (CPU) of a computer or the like may have a problem in which voltage noise may occur due to a rapid change in a load current while a low voltage is provided. MLCCs have been widely used in power supply devices for the use of a decoupling capacitor for suppressing voltage noise. In the case of MLCC for the use of decoupling or the like, attempts have been made to reduce impedance in a wide band.

SUMMARY

An aspect of the present disclosure provides a capacitor component having a plurality of resonance frequencies to effectively control impedance in a wide frequency band. Another aspect of the present disclosure provides a component having a reduced size by including the capacitor component described above.

According to an aspect of the present disclosure, a novel capacitor component includes: a body including a plurality of dielectric layers having a layered structure, and first internal electrodes and second internal electrodes alternately disposed with respective dielectric layers of the plurality of dielectric layers interposed therebetween; a first external electrode formed on a first surface and a second surface of the body opposing each other, and connected to the first internal electrodes; and a second external electrode formed on at least one of a third surface and a fourth surface of the body connecting the first surface to the second surface and opposing each other, and connected to the second internal electrodes. The capacitor component is divided into a plurality of capacitor units each including a portion of the first internal electrodes and a portion of the second internal electrodes, and the plurality of capacitor units include a first capacitor unit and a second capacitor unit. A distance between lead out portions of a first internal electrode and a second internal electrode included in the first capacitor unit is different from a distance between lead out portions of a first internal electrode and a second internal electrode included in the second capacitor unit.

At least a portion of the plurality of capacitor units may generate different resonance frequencies from those of a remaining portion thereof.

Based on the layering direction, a lead out portion of the first internal electrode included in the first capacitor unit may be disposed in a position different from a lead out portion of the first internal electrode included in the second capacitor unit.

Based on the layering direction, a lead out portion of the second internal electrode included in the first capacitor unit may have a width different from a width of a lead out portion of the second internal electrode included in the second capacitor unit.

The number of a lead out portion of the second internal electrode included in the first capacitor unit may be different from the number of a lead out portion of the second internal electrode included in the second capacitor unit.

The second internal electrode included in the first capacitor unit may include two lead out portions, and the second internal electrode included in the second capacitor unit may include a single lead out portion.

The two lead out portions of the second internal electrode included in the first capacitor unit may have the same width.

The second internal electrode may be connected to the second external electrode only by a lead out portion exposed to the third surface.

The second external electrode may not be formed on the fourth surface.

The second capacitor unit may be interposed between the first capacitor unit.

The distance between lead out portions of a first internal electrode and a second internal electrode included in the first capacitor unit may be greater than the distance between lead out portions of a first internal electrode and a second internal electrode included in the second capacitor unit.

A lead out portion of the second internal electrode included in the first capacitor unit may have a width less than a width of a lead out portion of the second internal electrode included in the second capacitor unit.

The second internal electrode included in the first capacitor unit may include two lead out portions, and the second internal electrode included in the second capacitor unit may include a single lead out portion.

The first internal electrode may include two lead out portions exposed to the first surface and the second surface, respectively, to be connected to the first external electrode.

The second internal electrode may include a single lead out portion exposed to the third surface to be connected to the second external electrode.

The first internal electrode and the second internal electrode may be disposed to be perpendicular to the third surface.

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION

Figure 1:
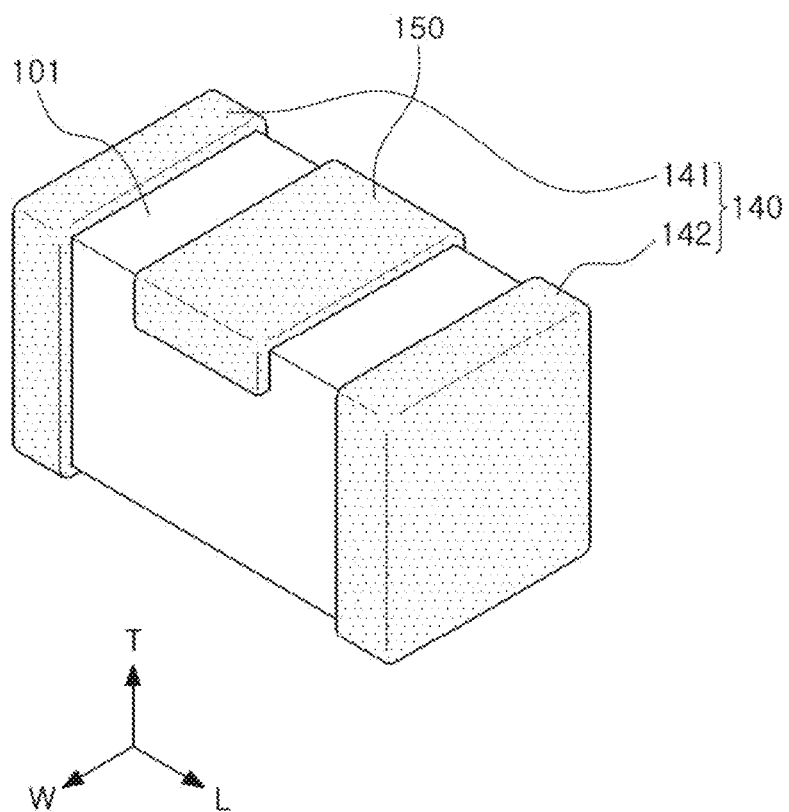
FIG. 1 is a perspective view schematically illustrating a capacitor component according to an exemplary embodiment.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship relative to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Figure 2:
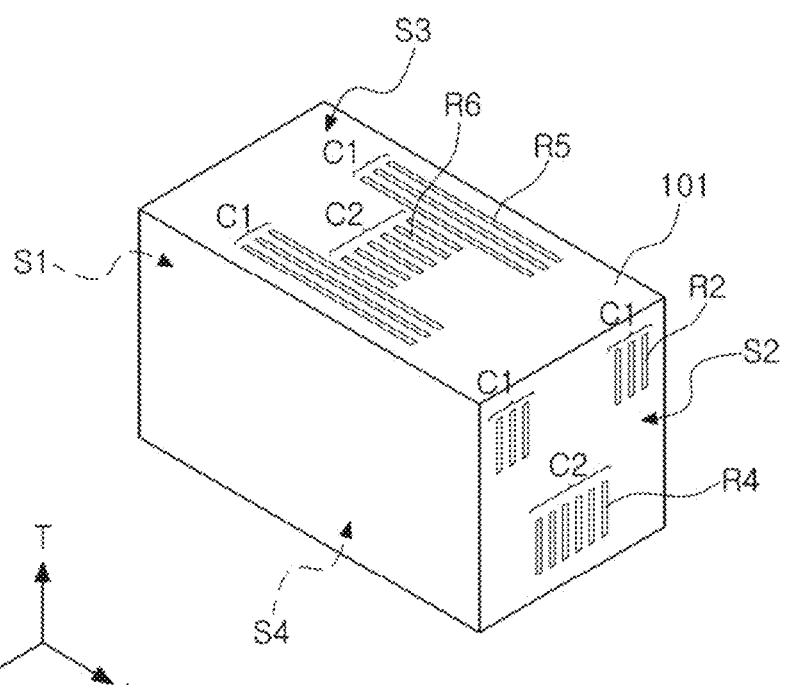
FIG. 2 is a perspective view schematically illustrating a form of a body in the capacitor component in FIG. 1.
Figure 3:
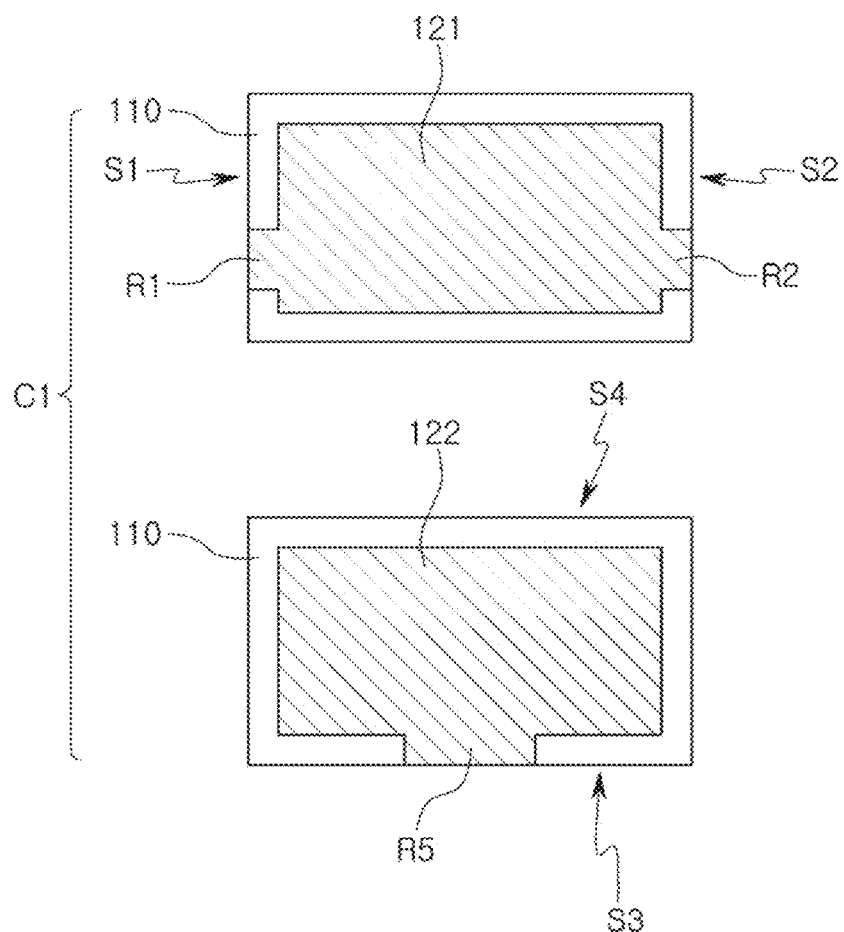
FIG. 3 is a plan view schematically illustrating a form of a first internal electrode and a second internal electrode included in a first capacitor unit in the capacitor component in FIG. 1.
Figure 4:
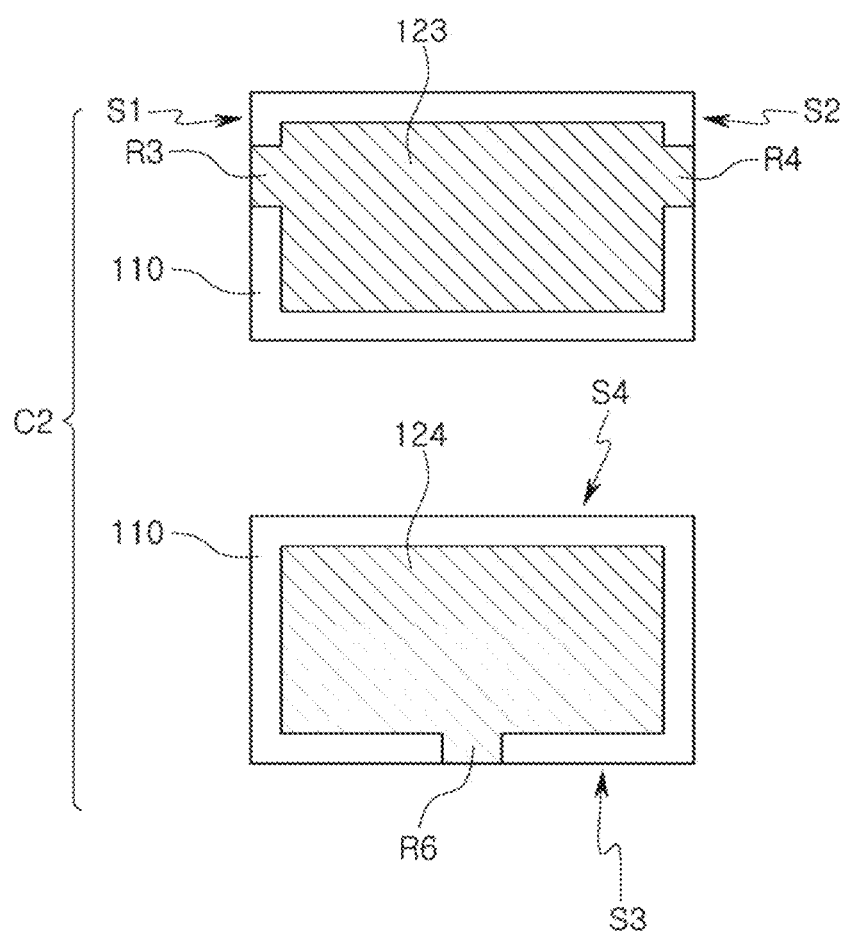
FIG. 4 is a plan view schematically illustrating a form of a first internal electrode and a second internal electrode included in a second capacitor unit in the capacitor component in FIG. 1.

FIG. 1 is a perspective view schematically illustrating a capacitor component according to an exemplary embodiment. FIG. 2 is a perspective view schematically illustrating a form of a body of the capacitor component in FIG. 1. FIG. 3 is a plan view schematically illustrating a form of a first internal electrode and a second internal electrode included in a first capacitor unit of the capacitor component in FIG. 1. FIG. 4 is a plan view schematically illustrating a form of a first internal electrode and a second internal electrode included in a second capacitor unit in the capacitor component in FIG. 1.

With reference to FIGS. 1 to 4, a capacitor component 100 according to an exemplary embodiment may include a body 101, first internal electrodes 121 and 123, second internal electrodes 122 and 124 as well as a first external electrode 140 and a second external electrode 150. Each capacitor component may be divided into a plurality of capacitor units C1 and C2 including a portion of the first internal electrodes and second internal electrode 121 to 124. In an exemplary embodiment, the plurality of capacitor units is exemplified to include a first capacitor unit C1 and a second capacitor unit C2, but may include an additional capacitor unit.

Figure 5:
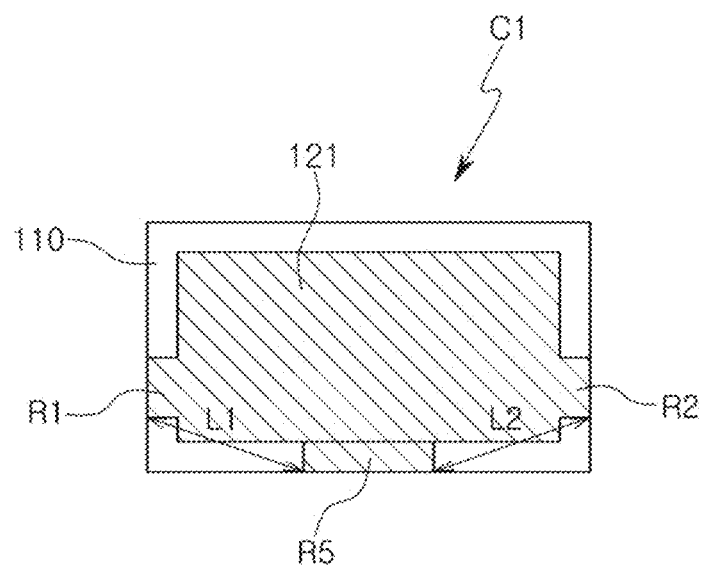
FIG. 5 illustrates that a first internal electrode and a second internal electrode are overlapped in a first capacitor unit.
Figure 6:
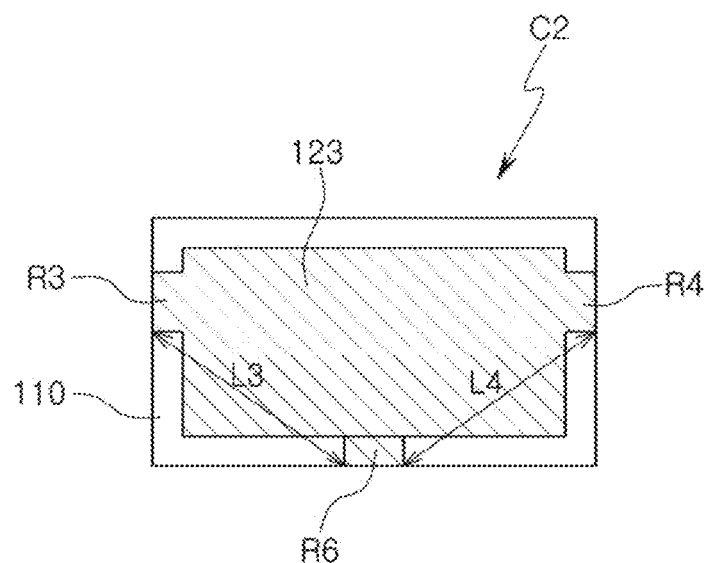
FIG. 6 illustrates that a first internal electrode and a second internal electrode are overlapped in a second capacitor unit.

In the case of the first capacitor unit C1 and the second capacitor unit C2, as seen from a form illustrated in FIGS. 5 and 6, a distance between lead out portions L1 and L2 of the first internal electrode 121 and the second internal electrode 122 included in the first capacitor unit C1 is different from a distance between lead out portions L3 and L4 of the first internal electrode 123 and the second internal electrode 124 included in the second capacitor unit C2. The distances between lead out portions are different from each other to allow current paths to be different from each other, and thus, at least a portion of a plurality of capacitor units may generate resonance frequencies different therefrom. In an exemplary embodiment, resonance frequencies of the first capacitor unit C1 and the second capacitor unit C2 may be different from each other to improve a noise removal effect when the capacitor component 100 is applied to a filter or the like.

The first external electrode 140 may be formed on the first surface S1 and the second surface S2 of the body 101 opposing each other, and may be connected to the first internal electrodes 121 and 123. In the first external electrode 140, a first external electrode formed on the first surface S1 denotes 141, and a first external electrode formed on the second surface S2 denotes 142. In this case, the first surface S1 and the third surface S3 may be disposed to be perpendicular to each other, and thus, the body 101 may have a rectangular parallelepiped shape or a shape similar thereto.

Figure 7:
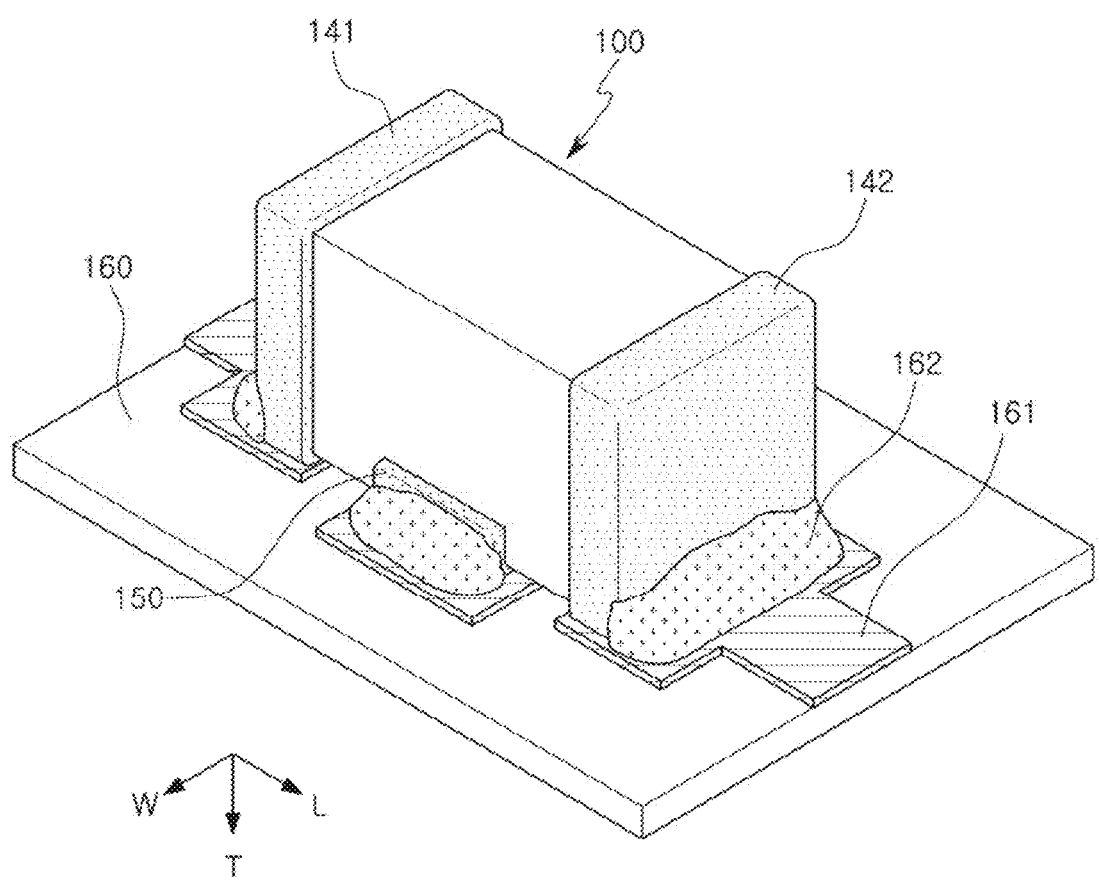
FIG. 7 illustrates a form in which a capacitor component according to an exemplary embodiment is mounted on a substrate.

The second external electrode 150 may be formed on at least one of the third surface S3 and the fourth surface S4 of the body 101 connecting the first surface S1 to the second surface S2 and opposing each other, and may be connected to the second internal electrodes 122 and 124. In an exemplary embodiment, a 3-terminal structure in which the second external electrode 150 is formed on the third surface S3 and is not formed on the fourth surface S4 is illustrated. The capacitor component 100 having an external electrode structure described above may be mounted as illustrated in FIG. 7. In other words, in the capacitor component 100 in the 3-terminal form, the third surface S3 on which the second external electrode 150 is formed is disposed to oppose the mounting substrate 160 to be connected to the circuit pattern 161. In this case, a solder 162 may be provided for stably mounting the capacitor component 100. In this case, the capacitor component 100 may be disposed in a vertical mounting method. In other words, first internal electrodes and second internal electrodes 121 to 124 may be disposed to be perpendicular to a mounting surface (a surface parallel to a third surface). Due to the vertical mounting method, lead out portions of the first internal electrodes and second internal electrode 121 to 124 may be disposed to be close to a mounting surface so as to reduce equivalent series inductance (ESL) and impedance.

The body 101 may include a plurality of dielectric layers 110 having a layered structure and the first internal electrodes and second internal electrodes 121 to 124 alternately disposed with a dielectric layer 110 of the plurality of dielectric layers disposed therebetween. The dielectric layer 110 included in the body 101 may be formed using a dielectric material known in the art, such as ceramic or the like, for example, $BaTiO_3$ (barium titanate)-based ceramic powder or the like. In this case, the $BaTiO_3$-based ceramic powder may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$ or the like in which a portion of calcium (Ca), zirconium (Zr) is added to $BaTiO_3$, according to an exemplary embodiment, but is not limited thereto.

As illustrated in FIGS. 2, 3, and 4, the first internal electrodes 121 and 123 and the second internal electrodes 122 and 124 include lead out portions to be connected to external electrodes 140 and 150. In detail, with reference to FIG. 3, the first internal electrode 121 included in the first capacitor unit C1 may include two lead out portions R1 and R2, and the two lead out portions R1 and R2 may be exposed to the first surface S1 and the second surface S2, respectively, to be connected to the first external electrode 140. In addition, the second internal electrode 122 included in the first capacitor unit C1 includes a single lead out portion R5, exposed to the third surface S3 to be connected to the second external electrode 150. On the other hand, the number or a form of a lead out portion may be modified in a range in which the technical idea of an exemplary embodiment is maintained.

In addition, with reference to FIG. 4, the first internal electrode 123 included in the second capacitor unit C2 may include two lead out portions R3 and R4, to be exposed to the first surface S1 and the second surface S2, respectively, to be connected to the first external electrode 140. In addition, the second internal electrode 124 included in the second capacitor unit C2 may include a single lead out portion R6, exposed to the third surface S3 to be connected to the second external electrode 150. In a manner similar thereto, the number of or a form of lead out portions may be modified in a range in which the technical idea of an exemplary embodiment is maintained.

In this case, as illustrated in FIG. 4, based on a direction in which the first internal electrodes and second internal electrodes 121 to 124 are layered, the lead out portions R1 and R2 of the first internal electrode 121 included in the first capacitor unit C1 may be disposed in a position different from that of the lead out portions R3 and R4 of the first internal electrode 123 included in the second capacitor unit C2. In an exemplary embodiment, lead out portions R1 to R6 of internal electrode 121 to 124 having the same polarity may be disposed in different positions in different capacitor units C1 and C2 to allow a distance from lead out portions R1 to R6 of internal electrodes 121 to 124 having different polarity to be different.

In addition, with reference to or independently from a manner in which lead out portion R1 to R4 of the first internal electrodes 121 and 123 are disposed, the lead out portion R5 of the second internal electrode 122 included in the first capacitor unit C1 has a different width from that of the lead out portion R6 of the second internal electrode 124 included in the second capacitor unit C2. In an exemplary embodiment, a width of the lead out portion R5 of the second internal electrode 122 included in the first capacitor unit C1 may be greater than that of the lead out portion R6 of the second internal electrode 124 included in the second capacitor unit C2. Due to a structure described with reference to FIGS. 5 and 6, distances between lead out portions in a capacitor unit may be different from each other. FIG. 5 illustrates that the first internal electrode 121 and the second internal electrode 122 are overlapped with each other in the first capacitor unit C1, and FIG. 6 illustrates that the first internal electrode 123 and the second internal electrode 124 are overlapped with each other in the second capacitor unit C2.

As illustrated, distances L1 and L2 between the lead out portion R1 and R2 of the first internal electrode 121 included in the first capacitor unit C1 and the lead out portion R5 of the second internal electrode 122 are less than distances L3 and L4 between the lead out portions R3 and R4 of the first internal electrode 123 included in the second capacitor unit C2 and the lead out portion R6 of the second internal electrode 124. Due to a difference in distances between lead out portions capacitor unit C1 and C2 may be connected to in parallel to generate different resonance frequencies.

On the other hand, the second capacitor unit C2 in which distances L3 and L4 between lead out portions are great has relatively high equivalent series inductance (ESL) and equivalent series resistance (ESR). In this case, as illustrated in FIG. 2, the second capacitor unit C2 is interposed between the first capacitor unit C1 to appropriately adjust ESR while ESL of an overall capacitor component 100 is reduced.

Figure 8:
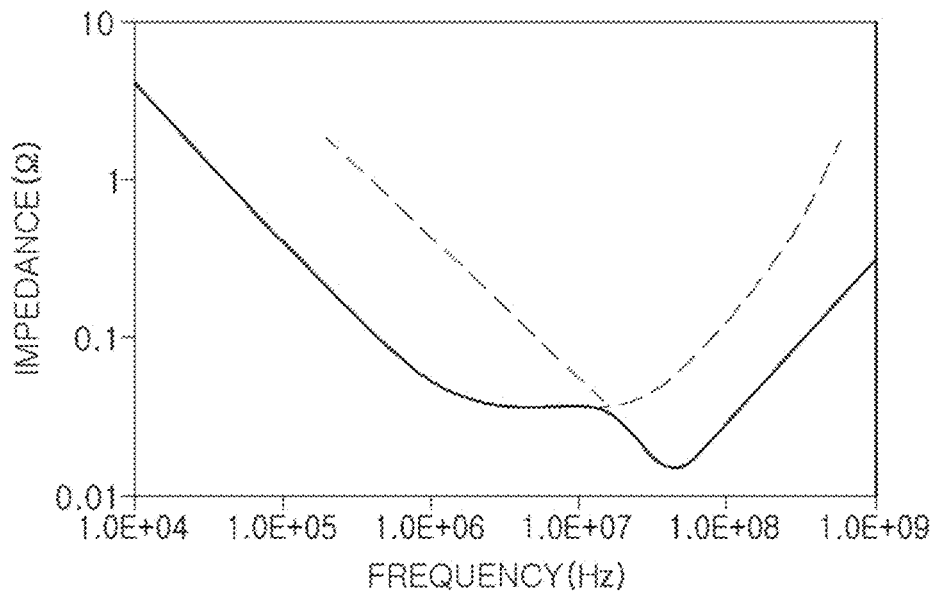
FIG. 8 is a graph illustrating impedance characteristics of a capacitor component obtained according to an exemplary embodiment.

FIG. 8 is a graph illustrating impedance characteristics of a capacitor component obtained according to an exemplary embodiment. As seen in an impedance characteristics graph in FIG. 8, in the case of the capacitor component 100 according to an exemplary embodiment, two types of capacitors (a first capacitor unit and a second capacitor unit) having different resonance frequencies are included within a single component, and impedance at a low level in a wide frequency band may be maintained. Thus, the capacitor component 100 is used to reduce the number of decoupling capacitors used in a power supply device, a high-speed microprocessor unit (MPU) or the like, and to effectively reduce mounting costs or space of a decoupling capacitor.

Figure 9:
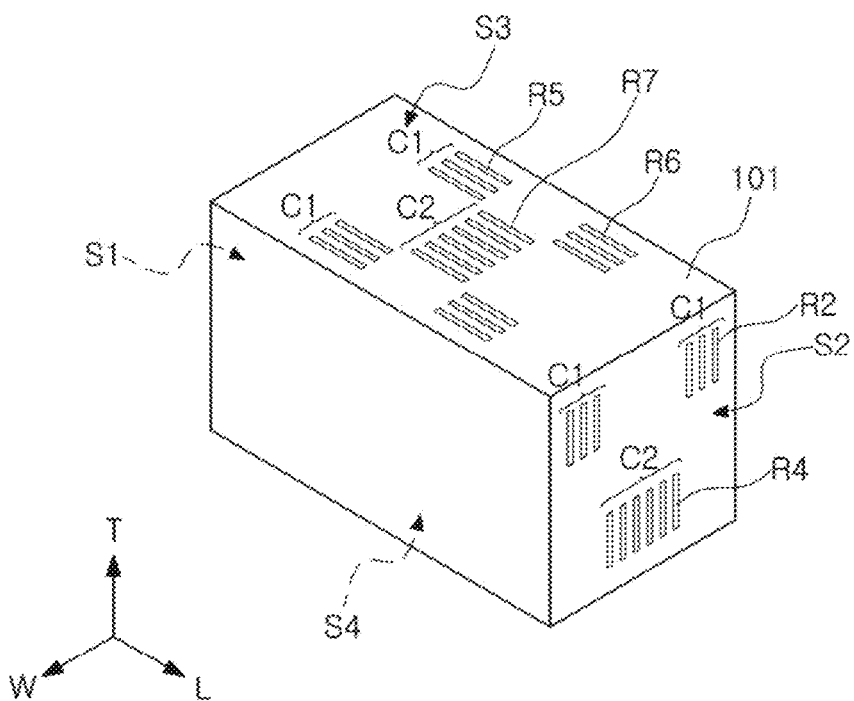
FIG. 9 is a perspective view schematically illustrating a form of a body to be employed in a capacitor component of a modified example.
Figure 10:
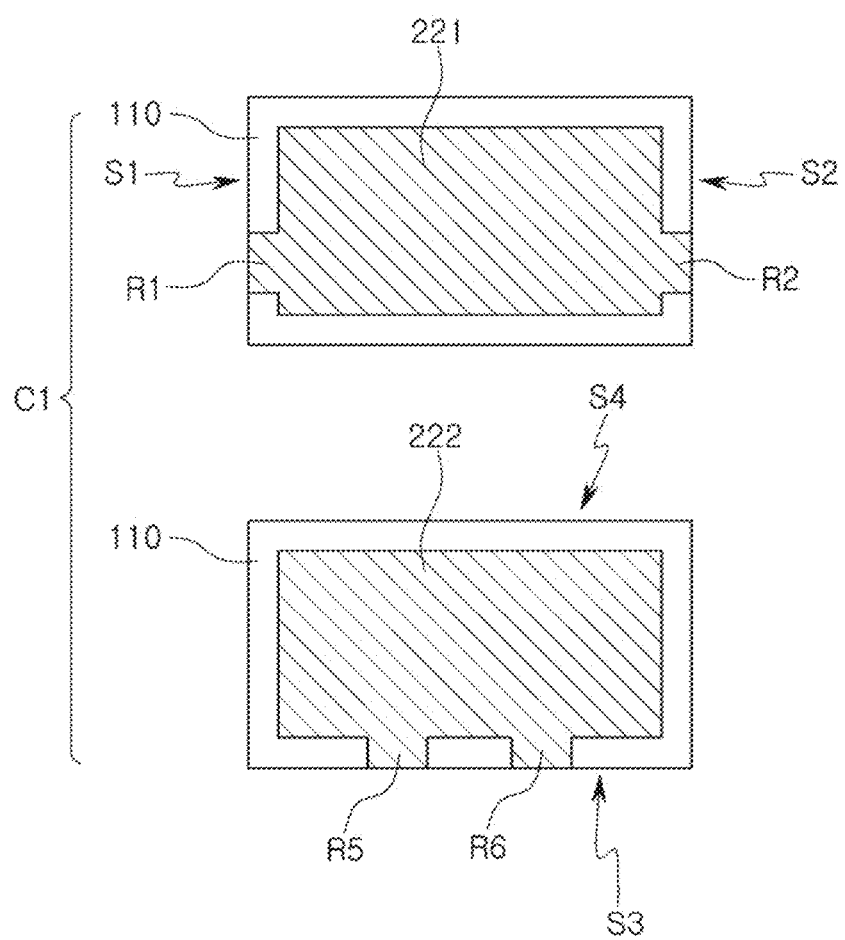
FIG. 10 is a plan view schematically illustrating a form of a first internal electrode and a second internal electrode included in a first capacitor unit of a capacitor component according to a modified example.
Figure 11:
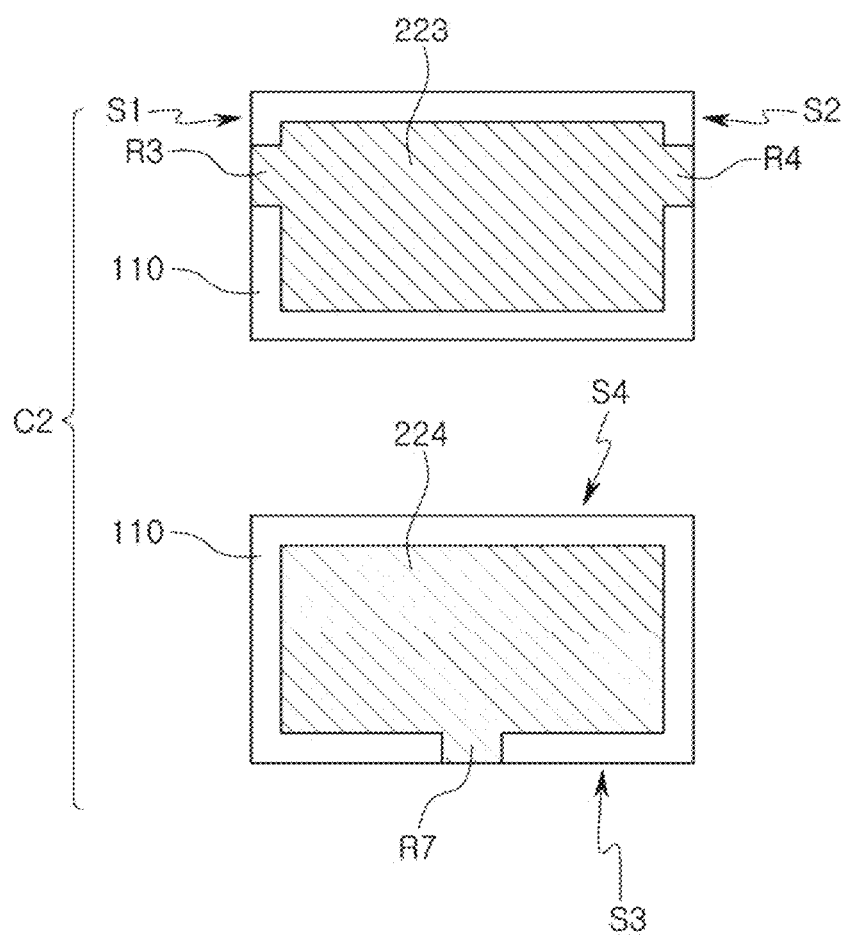
FIG. 11 is a plan view schematically illustrating a form of a first internal electrode and a second internal electrode included in a second capacitor unit of a capacitor component according to a modified example.
Figure 12:
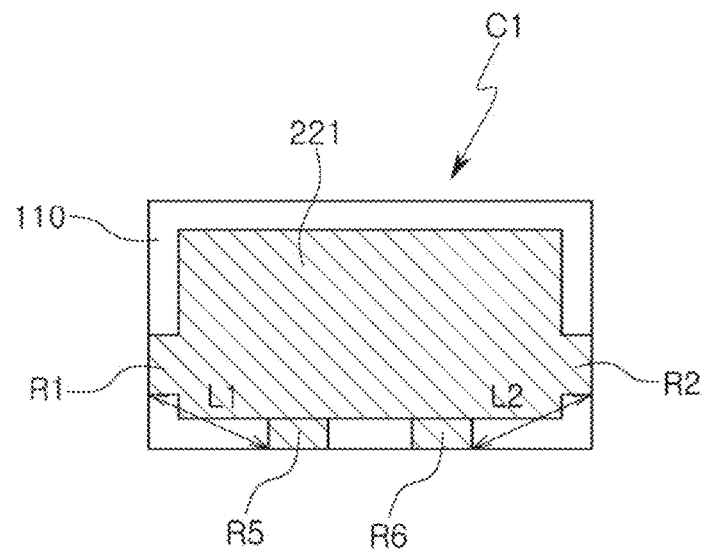
FIG. 12 illustrates that a first internal electrode and a second internal electrode are overlapped in a first capacitor unit.
Figure 13:
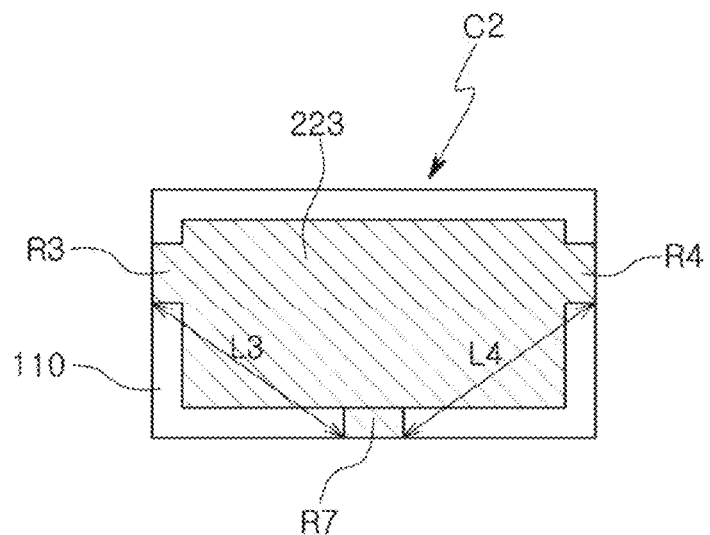
FIG. 13 illustrates that a first internal electrode and a second internal electrode are overlapped in a second capacitor unit.

With reference to FIGS. 9 to 13, a modified exemplary embodiment will be described. FIG. 9 is a perspective view schematically illustrating a form of a body employed in a capacitor component of a modified example. FIG. 10 is a plan view schematically illustrating a form of a first internal electrode and a second internal electrode included in a first capacitor unit of a capacitor component according to a modified example. FIG. 11 is a plan view schematically illustrating a form of a first internal electrode and a second internal electrode included in a second capacitor unit in a capacitor component according to a modified example. In addition, FIG. 12 illustrates that the first internal electrode 221 and a second internal electrode 222 are overlapped with each other in the first capacitor unit C1, and FIG. 13 illustrates that a first internal electrode 223 and a second internal electrode 224 are overlapped with each other in the second capacitor unit C2.

As illustrated in FIG. 10, the first internal electrode 221 included in the first capacitor unit C1 includes two lead out portions R1 and R2, exposed to the first surface S1 and the second surface S2, respectively. In addition, the second internal electrode 222 included in the first capacitor unit C1 may include two lead out portions R5 and R6, exposed to the third surface S3. On the other hand, the number or a form of a lead out portion may be modified in a range to maintain the technical idea of an exemplary embodiment.

As illustrated in FIG. 11, the first internal electrode 223 included in the second capacitor unit C2 includes two lead out portions R3 and R4, exposed to the first surface S1 and the second surface S2. In addition, the second internal electrode 224 included in the second capacitor unit C2 includes a single lead out portion R7, exposed to the third surface S3. In a manner similar thereto, the number or a form of a lead out portion may be modified in a range to maintain the technical idea of an exemplary embodiment.

In a manner similar to an exemplary embodiment described previously, based on a direction in which first internal electrodes and second internal electrodes 121 to 124 are layered, the lead out portions R1 and R2 of the first internal electrode 221 included in the first capacitor unit C1 are disposed in a position different from that of the lead out portions R3 and R4 of the first internal electrode 223 included in the second capacitor unit C2, which is an example of a method for allowing a distance with lead out portions R1 to R7 of internal electrodes 221 to 224 having different polarity to be different.

In addition, with reference to or independently from a manner in which lead out portions R1 to R4 of the first internal electrodes 221 and 223 are disposed, the number of lead out portions of the second internal electrode 222 included in the first capacitor unit C1 is different from that of the second internal electrode 224 included in the second capacitor unit C2. In detail, the second internal electrode 222 included in the first capacitor unit C1 may include two lead out portions R5 and R6, and the second internal electrode 224 included in the second capacitor unit C2 may include a single lead out portion R7. In this case, in a manner different from an exemplary embodiment described previously, two lead out portions R5 and R6 of the second internal electrode 222 included in the first capacitor unit C1 may have the same width.

In a modified example, the number of lead out portions and resonance frequencies of the first capacitor unit C1 and the second capacitor unit C2 may be modified. In other words, as illustrated in FIGS. 12 and 13, distances L1 and L2 between the lead out portions R1 and R2 of the first internal electrode 221 included in the first capacitor unit C1 and the lead out portions R5 and R6 of the second internal electrode 222 may be less than distances L3 and L4 between the lead out portions R3 and R4 of the first internal electrode 223 included in the second capacitor unit C2 and the lead out portion R7 of the second internal electrode 224. Due to a difference between lead out portions described above, capacitor units C1 and C2 are connected to each other in parallel to generate different resonance frequencies.

As set forth above, according to an exemplary embodiment, an impedance reduced capacitor component for effectively removing a noise from a wide frequency band may be obtained.

While exemplary embodiments have been shown and described above, it will be apparent to those skilled in the art that modifications and variations could be made without departing from the scope of the present invention as defined by the appended claims.

What is claimed is:

1. A capacitor component, comprising:
    a body including a plurality of dielectric layers having a layered structure, and first internal electrodes and second internal electrodes alternately disposed with respective dielectric layers of the plurality of dielectric layers interposed therebetween;
    first external electrodes formed on a first surface and a second surface of the body opposing each other, and connected to the first internal electrodes; and
    a second external electrode formed on at least one of a third surface and a fourth surface of the body connecting the first surface to the second surface and opposing each other, and connected to the second internal electrodes,
    wherein the capacitor component is divided into a plurality of capacitor units each including a portion of the first internal electrodes and a portion of the second internal electrodes, the plurality of capacitor units including a first capacitor unit and a second capacitor unit, and
    a distance between lead out portions of a first internal electrode and a second internal electrode included in the first capacitor unit is different from a distance between lead out portions of a first internal electrode and a second internal electrode included in the second capacitor unit.

2. The capacitor component of claim 1, wherein at least a portion of the plurality of capacitor units generates different resonance frequencies from those of a remaining portion thereof.

3. The capacitor component of claim 1, wherein, based on the layering direction, a lead out portion of the first internal electrode included in the first capacitor unit is disposed in a position different from a lead out portion of the first internal electrode included in the second capacitor unit.

4. The capacitor component of claim 1, wherein, based on the layering direction, a lead out portion of the second internal electrode included in the first capacitor unit has a width different from a width of a lead out portion of the second internal electrode included in the second capacitor unit.

5. The capacitor component of claim 1, wherein a number of a lead out portion of the second internal electrode included in the first capacitor unit is different from a number of a lead out portion of the second internal electrode included in the second capacitor unit.

6. The capacitor component of claim 5, wherein the second internal electrode included in the first capacitor unit includes two lead out portions, and the second internal electrode included in the second capacitor unit includes a single lead out portion.

7. The capacitor component of claim 6, wherein the two lead out portions of the second internal electrode included in the first capacitor unit have the same width.

8. The capacitor component of claim 1, wherein the second internal electrode is connected to the second external electrode only by a lead out portion exposed to the third surface.

9. The capacitor component of claim 8, wherein the second external electrode is not formed on the fourth surface.

10. The capacitor component of claim 1, wherein the second capacitor unit is interposed between first and second portions of the first capacitor unit.

11. The capacitor component of claim 10, wherein the distance between the lead out portions of the first and second internal electrodes included in the first capacitor unit is less than the distance between the lead out portions of the first and second internal electrodes included in the second capacitor unit.

12. The capacitor component of claim 11, wherein the lead out portion of the second internal electrode included in the first capacitor unit has a width greater than a width of the lead out portion of the second internal electrode included in the second capacitor unit.

13. The capacitor component of claim 11, wherein the second internal electrode included in the first capacitor unit includes two lead out portions, and the second internal electrode included in the second capacitor unit includes a single lead out portion.

14. The capacitor component of claim 1, wherein the first internal electrode includes two lead out portions exposed to the first surface and the second surface, respectively, to be connected to the first external electrode.

15. The capacitor component of claim 1, wherein the second internal electrode includes a single lead out portion exposed to the third surface to be connected to the second external electrode.

16. The capacitor component of claim 1, wherein the first internal electrode and the second internal electrode are disposed to be perpendicular to the third surface.

* * * * *